(12) United States Patent
Grosse-Puppendahl et al.

(10) Patent No.: US 10,853,275 B2
(45) Date of Patent: Dec. 1, 2020

(54) DATA TRANSFER BETWEEN HOST AND PERIPHERAL DEVICES

(71) Applicant: Microsoft Technology Licensing, LLC, Redmond, WA (US)

(72) Inventors: Tobias Alexander Grosse-Puppendahl, Cambridge (GB); James William Scott, Tifton, GA (US); Stephen Edward Hodges, Cambridge (GB); John Franciscus Marie Helmes, Steyl (NL); Nicholas Yen-Cherng Chen, Cambridge (GB); Stuart Alastair Taylor, Cambridge (GB); Pascal Knierim, Munich (DE); Josh Fromm, Seattle, WA (US); Gavin Wood, Newcastle Upon Tyne (GB); Albrecht Schmidt, Satteldorf (DE)

(73) Assignee: Microsoft Technology Licensing, LLC, Redmond, CA (US)

( * ) Notice: Subject to any disclaimer, the term of this patent is extended or adjusted under 35 U.S.C. 154(b) by 0 days.

(21) Appl. No.: 16/284,399

(22) Filed: Feb. 25, 2019

(65) Prior Publication Data
US 2019/0294562 A1 Sep. 26, 2019

Related U.S. Application Data

(63) Continuation of application No. 15/089,177, filed on Apr. 1, 2016, now Pat. No. 10,248,584.

(51) Int. Cl.
*G06F 13/40* (2006.01)
*G06F 13/10* (2006.01)
(Continued)

(52) U.S. Cl.
CPC ........ *G06F 13/102* (2013.01); *G06F 11/3041* (2013.01); *G06F 11/3051* (2013.01);
(Continued)

(58) Field of Classification Search
CPC .. G06F 11/00; H04M 1/0254; H04M 1/72527
(Continued)

(56) References Cited

U.S. PATENT DOCUMENTS 6,972,732 B1 * 12/2005 Nishikawa ............ G06F 3/1431
345/1.1
8,006,002 B2 * 8/2011 Kalayjian ............. H04W 4/029
710/36
(Continued)

OTHER PUBLICATIONS

"Office Action Issued in European Patent Application No. 17719378.6", dated Nov. 8, 2019, 5 Pages.

*Primary Examiner* — Christopher B Shin
(74) *Attorney, Agent, or Firm* — Schwegman Lundberg & Woessner, P.A.

(57) ABSTRACT

A device, which may be a peripheral device or a host computing device, comprises a communication interface, a memory and a processor. The processor is arranged to detect imminent disconnection of a communication link between the peripheral device and the host computing device and in response to detecting the imminent disconnection of the communication link, to trigger a data transfer from the host computing device to the peripheral device via the communication interface. The data transfer defines, at least in part, a fixed output data set which, after disconnection, is output via an output device in the peripheral device.

20 Claims, 4 Drawing Sheets

(51) Int. Cl.
*G06F 13/38* (2006.01)
*H04M 1/02* (2006.01)
*H04M 1/725* (2006.01)
*G06F 11/30* (2006.01)
*G06F 13/42* (2006.01)
G06F 13/00 (2006.01)
H04M 1/72 (2006.01)

(52) U.S. Cl.
CPC ........ *G06F 13/382* (2013.01); *G06F 13/4081* (2013.01); *G06F 13/4286* (2013.01); *H04M 1/0254* (2013.01); *H04M 1/72527* (2013.01)

(58) Field of Classification Search
USPC .......................................................... 710/6
See application file for complete search history.

(56) References Cited

U.S. PATENT DOCUMENTS

| | | | |
|---|---|---|---|
| 9,575,614 B1* | 2/2017 | Aebersold | G06F 3/048 |
| 2004/0203698 A1* | 10/2004 | Comp | H04W 8/005 |
| | | | 455/421 |

* cited by examiner

DATA TRANSFER BETWEEN HOST AND PERIPHERAL DEVICES

CROSS-REFERENCE TO RELATED APPLICATION

This application is a continuation of U.S. patent application Ser. No. 15/089,177, titled "DATA TRANSFER BETWEEN HOST AND PERIPHERAL DEVICES" and filed Apr. 1, 2016, the disclosure of which is hereby incorporated by reference in its entirety.

BACKGROUND

Users often use many computing devices throughout a day: a laptop computer, a tablet computer, a smartphone, a smart television, a games console, etc. Even where such devices are portable, carrying multiple devices around may be inconvenient and cumbersome; however, a user may want to quickly access data from any or all of these devices.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A device, which may be a peripheral device or a host computing device, comprises a communication interface, a memory and a processor. The processor is arranged to detect imminent disconnection of a communication link between the peripheral device and the host computing device and in response to detecting the imminent disconnection of the communication link, to trigger a data transfer from the host computing device to the peripheral device via the communication interface. The data transfer defines, at least in part, a fixed output data set which, after disconnection, is output via an output device in the peripheral device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Described herein is a computing device that is arranged to detect imminent disconnection of a peripheral device from a host computing device and in response to detecting imminent disconnection to trigger a data transfer from the host computing device to the peripheral computing device. This computing device (which performs the detection and triggering) may be either the peripheral device or the host computing device or a connecting piece (e.g. a cable or adapter) between the host computing device and the peripheral device. The peripheral device comprises an output device (e.g. a persistent display or speaker) and following disconnection from the host computing device, the data available for output via the output device (referred to herein as the 'output data set') is fixed and in various examples may comprises a proper subset of the data stored on the peripheral device. Using the methods and apparatus described herein, the peripheral device acts as a gateway to information stored on the host computing device (via the output device in the peripheral device) when the host computing device is disconnected, where this disconnection may be a consequence of the host computing device being distant (i.e. too far away) from the peripheral device (e.g. left in another place, in a user's bag or pocket).

The embodiments described below are not limited to implementations which solve any or all of the disadvantages of known host computing devices and/or peripheral devices and the communication protocols used between them.

Figure 1:
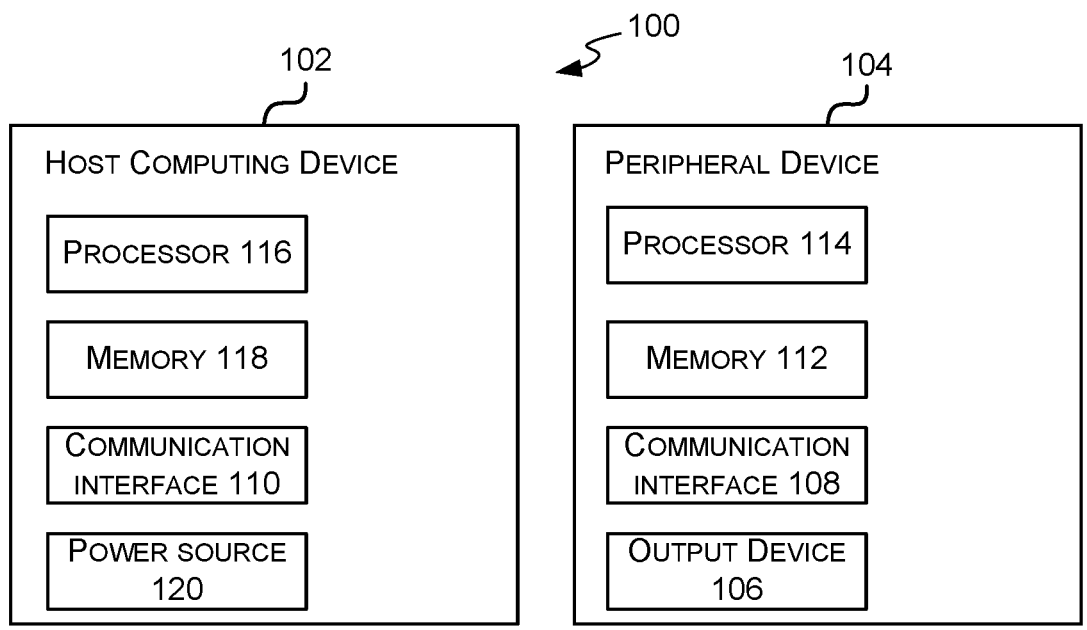
FIG. 1 is a schematic diagram of system comprising a host computing device and a peripheral device.

FIG. 1 is a schematic diagram of system 100 comprising a host computing device 102 and a peripheral device 104. The peripheral device 104 comprises an output device 106, a communication interface 108, memory 112 and processor 114. The host computing device 102 comprises a communication interface 110, processor 116, memory 118 and power source 120. As is described below, either or both devices may also comprise additional functional elements in addition to those shown in FIG. 1. For example, the host device 102 may also comprise an output device and/or the peripheral device 104 may also comprise a power source, although the type of power source may be different to the power source 120 in the host computing device 102 (e.g. it may be a limited capacity battery).

The host computing device 102 may, for example, be a portable or handheld computing device (e.g. a smart phone, laptop computer, tablet computer, handheld games console, etc.). Alternatively, the host computing device 102 may be a non-portable computing device such as a desktop computer, smart television or games console. The peripheral device 104 may, for example, be a wearable device or other portable device (e.g. a small display device which may be placed in a user's pocket or wallet or a larger display device that operates as an electronic photograph frame). Alternatively, the peripheral device 104 may be a larger, non-portable device, for example, a computer monitor (or display), a larger electronic photo-frame (e.g. which may be permanently installed), a situated display, a smart television, a display integrated into a larger appliance (e.g. integrated into the front panel of a home appliance such as a refrigerator), a music player, a computing device using speech-based interaction (e.g. a Bluetooth™ headset augmented to enable useful operation when disconnected from the host device) etc.

The peripheral device 104 and the host computing device 102 are configured to communicate via communication interfaces 108, 110 such that data for consumption by a user can be transferred from the host computing device 102 to the peripheral device 104, stored in the memory 112 in the peripheral device 104 and subsequently (e.g. following disconnection of the host and peripheral devices) output via the output device 106. Each device 102, 104 comprises a processor 114, 116 which controls the operation of the respective device and instructions for execution by the processors 114, 116 are stored in the memories 112, 118 of the respective devices.

The output device 106 in the peripheral device 104 may be a visual output device (e.g. a printer or an electronic paper display), an audio output device (e.g. a speaker), a haptic feedback device or any combination thereof (e.g. an audio-visual output device). Depending on the type of output device 106 and whether there is any user interactivity with the peripheral device 104 (e.g. to cycle through the data in the fixed output data set following disconnection from the host computing device 102), the peripheral device 104 may also require a power source (not shown in FIG. 1) in order that the output device 106 can operate.

If the output device 106 is an electronic paper display and the content displayed on that display is fixed following disconnection from the host computing device 102, the peripheral device 104 does not require a power source. This is because electronic paper only requires power to change the image displayed and does not require continuous power to maintain the display in between and hence the electronic paper display can hold static images or text for long periods of time (e.g. from several minutes to several hours and even several days, months or years in some examples) without requiring significant power (e.g. without any power supply).

The term "electronic paper" is used herein to refer to display technologies which reflect light (like paper) instead of emitting light like conventional LCD displays. As they are reflective, electronic paper displays do not require a significant amount of power to maintain an image on the display and so may be described as persistent displays. Many electronic paper displays are multi-stable displays. In some display devices, an electronic paper display may be used together with light generation in order to enable a user to more easily read the display when ambient light levels are too low (e.g. when it is dark). In such examples, the light generation is used to illuminate the electronic paper display to improve its visibility rather than being part of the image display mechanism and the electronic paper does not require light to be emitted in order to function.

The term "multi-stable display" is used herein to describe a display which comprises pixels that can move between two or more stable states (e.g. a black state and a white state and/or a series of grey or colored states). Bi-stable displays, which comprise pixels having two stable states, are therefore examples of multi-stable displays. A multi-stable display can be updated when powered, but holds a static image when not powered and as a result can display static images for long periods of time with minimal or no external power. Consequently, a multi-stable display may also be referred to as a "persistent display" or "persistently stable" display. An electrophoretic ink layer is an example of a multi-stable layer which can be changed (or controlled) by applying electric fields. Other examples include a cholesteric liquid crystal layer or a bi-stable electrowetting display layer which is controlled using electric fields or currents applied via electrodes on the faces of a the layer.

The communication interfaces 108, 110 may use a wired interface (i.e. such that there is a direct conduction path between the two devices 102, 104, e.g. using 1-Wire, I²C, USB or a proprietary protocol) and in such examples, the peripheral device 104 physically connects to the host computing device 102. In other examples, the communication interfaces 108, 110 may use a short-range wireless connection which only operates over a few millimeters or centimeters (e.g. NFC, RFID, IrDA, TransferJet, 60 GHz short-range radio, etc.) and in such examples, the peripheral device 104 may or may not physically connect (i.e. physically attach) to the host computing device 102.

The processors 114, 116 in the two devices 102, 104 may be microprocessors, controllers or any other suitable type of processors for processing computer executable instructions to control the operation of the device in order to perform the methods described herein. In some examples, for example where a system on a chip architecture is used, the processors 114, 116 include one or more fixed function blocks (also referred to as accelerators) which implement a part of the methods described herein in hardware (rather than software or firmware). Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The processor 114 in the peripheral device 104 may not be the same as the processor 116 in the host computing device 102, e.g. the processor 114 in the peripheral device 104 may be a lower power processor and/or operate at a lower voltage than the processor 116 in the host computing device 102 and/or the processor 116 in the host computing device 102 may have more functionality (e.g. more processing power) than the processor 114 in the peripheral device 104.

The computer executable instructions which are executed by the processors 114, 116 are provided using any computer-readable media that is accessible by respective device 104, 102 and these computer executable instructions may include platform software (e.g. an operating system) and/or application software. Computer-readable media includes, for example, computer storage media such as memory 112, 118 and communications media. Computer storage media, such as memory 112, 118, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 112, 118) is shown within the devices 104, 102 it will be appreciated that the storage is, in some examples, distributed or located remotely and accessed via a network or other communication link (e.g. using communication interface 108, 110).

The power source 120 in the host computing device 102 may be any suitable power source including, but not limited to, a power supply which connects to a mains electricity supply, a battery or a power-harvesting system (e.g. a solar cell). Where the peripheral device 104 also includes a power source (not shown in FIG. 1) this may also be any suitable power source including any of the examples provided above. In some examples, however, the power source in the peripheral device 104 may only provide a limited supply of power, e.g. it may be a smaller battery, capacitor or super-capacitor or may use power-harvesting, and in various examples, a power source in the peripheral device 104 may be charged by the power source 120 in the host computing device 102 when the two devices 102, 104 are physically connected together (e.g. where the power is provided via connectors in each device) and/or physically in contact (e.g. where wireless charging is used or where the contacts are exposed on the surfaces of each device).

Figure 2:
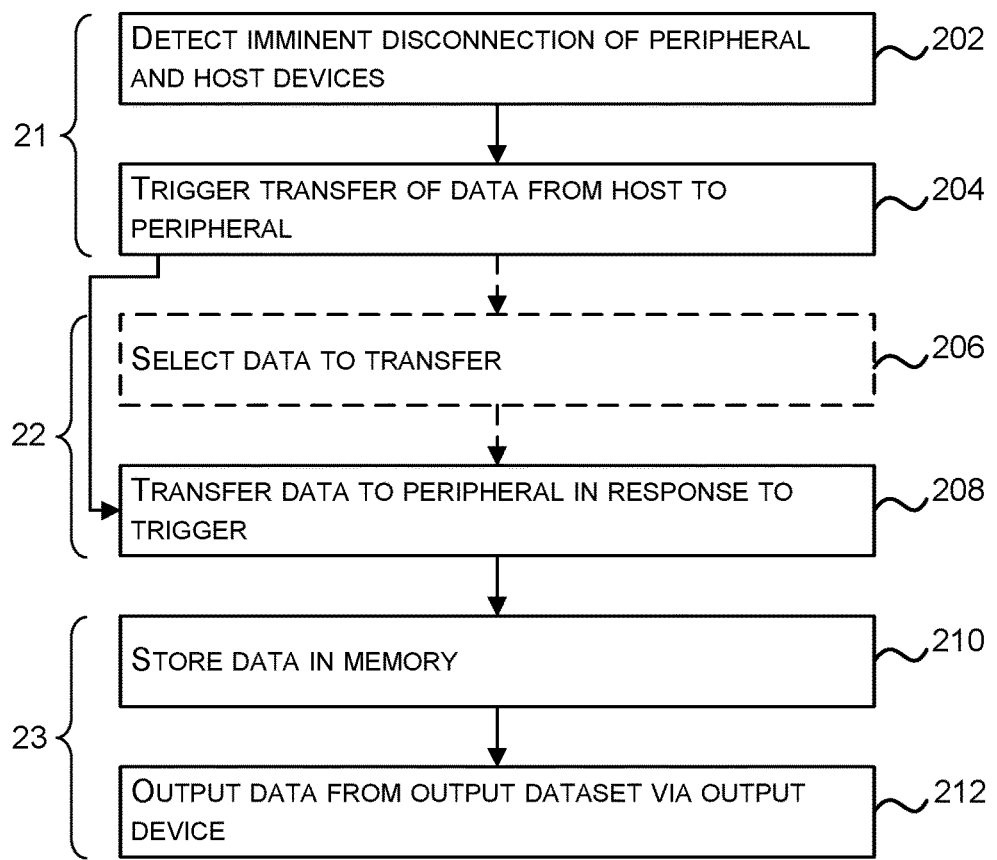
FIG. 2 is a flow diagram of an example method of operation of the system of FIG. 1.

FIG. 2 is a flow diagram of an example method of operation of a combination of the host computing device 102 and the peripheral device 104. Blocks 202-204 (referred to as the first part 21 of the method of FIG. 2) may be performed by either the host computing device 102 or the peripheral device 104, blocks 206-208 (or the second part 22 of the method of FIG. 2) are performed by the host computing device 102 (and in some examples, block 206 is omitted) and blocks 210-212 (or the third part 23 of the method of FIG. 2) are performed by the peripheral device 104.

The host computing device 102 or the peripheral device 104 detects imminent disconnection of the two devices 102, 104 (block 202). The term 'imminent disconnection' is used herein to refer to the imminent disconnection of the communication path between the two devices 102, 104 such that they are unable to communicate to each other (e.g. to transfer data from the host computing device to the peripheral device). This is distinct from referring to whether they are about to be physically disconnected from each other or physically separated, although for some communication technologies, such as wired technologies, the two may be equivalent.

When connected, i.e. such that they are able to communicate to each other (e.g. to transfer data from the host computing device to the peripheral device), the two devices may be physically connected (e.g. where the communication interfaces 108, 110 use a wired or wireless technology) or may be physically separate but in close proximity (e.g. within a few centimeters) of each other (e.g. where the communication interfaces 108, 110 use a wireless technology). When disconnected, i.e. such that they are unable to communicate to each other, the two devices are physically separated (i.e. so that they are not touching each other).

The detection of imminent disconnection of the communication path (in block 202) is performed automatically (in contrast to a user clicking on a software control to alert the device performing the first part of the method of FIG. 2 that they intend to disconnect the two devices) and may be performed in many different ways. As is described in the examples below, the detection of imminent disconnection may be based on parameters relating to the communication path itself or based on other parameters/factors which are indicative of the fact that the communication path is likely to be broken/disrupted within a short period of time.

In various examples, the detection (in block 202) may be based on one or more of:
Signal strength, quality or other signal parameter;
Power/load;
Touch/grip detection (e.g. detecting that the peripheral device is being gripped by a user);
Motion (e.g. that is detected directly using one or more sensors such as accelerometers); and
A change in position/separation as a result of movement (e.g. the indirect detection of motion using one or more sensors).

Depending on the way that detection is performed, it may be based on a binary decision (e.g. power from host computing device is available or not) or on an assessment of a gradual change in a parameter (e.g. signal strength reduces by 10%).

In various examples, the detection of imminent disconnection (in block 202) may be performed based on a change (e.g. drop) in signal strength/quality of the data connection between the host computing device 102 and the peripheral device 104 (or based on a change in another signal parameter). A threshold may be pre-defined which is used in detecting disconnection and this may be specified in relative terms (e.g. a 10% drop in signal strength) or absolute terms (e.g. signal strength falls below X dBm). In various examples, there may also be a time period associated with the threshold (e.g. a 10% drop in signal strength for a period exceeding Y ms) to avoid triggering data transfers as a result of an instantaneous signal drop out. As described below, in various examples more than one threshold may be defined. In various examples, machine learning may be used to learn how to infer the imminent disconnection from the signal strength (or other parameter) changes. Use of machine learning may mean that any threshold used is not static or absolute but may be a feature of the signal strength (or other parameter) either alone or in combination with other signals that are fed to the machine learning model.

In various examples, the detection of imminent disconnection (in block 202) may be performed based on a change in the power provided by the host computing device 102 to the peripheral computing device 104, where this may be detected as a change in the power drawn from the host computing device 102 (e.g. the load on the host computing device) as detected by the host computing device 102 or a change in the power supplied to the peripheral device 104, as detected by the peripheral device 104. Use of the loss of power provided from the host to the peripheral device as a metric in the detection of imminent disconnection requires the host computing device to provide power continuously to the peripheral device when the host computing device is powered on, because otherwise imminent disconnection will be detected thereby triggering a data transfer. If, however, the host computing device only provides power in bursts (e.g. when a power source in the peripheral device requires charging), which may reduce the power consumption of the host computing device, then an alternative technique may be used in addition or instead to detect imminent disconnection.

In various examples, the detection of imminent disconnection (in block 202) may be performed based on a change (e.g. increase) in separation of the two devices 102, 104 (e.g. using a proximity sensor, light sensor, pressure sensor, rotation sensor, where the disconnection requires rotation, microphone, where the disconnection operation has a characteristic sound, magnetic sensor, or any other suitable sensor). In various examples, the detection of imminent disconnection (in block 202) may be performed based on detecting motion of (or within) a connecting arrangement which physically connects the peripheral device 104 and host computing device 102 together, where the motion may be detected directly or a change in position/separation may be detected where this change is a result of motion. In various examples, the detection of imminent disconnection (in block 202) may be performed based on comparing sensor data from sensors in each of the host and peripheral devices.

For example, to physically separate the two devices may require a series of user actions (e.g. release locking element and then remove peripheral device) that takes a finite amount of time to complete (e.g. somewhere in the range of one tenth of a second to one second) and imminent disconnection may be detected (in block 202) by detecting the first user action in the series (or another action in the series which, where a wired data connection is used, is not the final act of separation or, where a wireless data connection is used, may be any action including the final act of physical separation). In another example, to physically separate the two devices may require a sliding motion (e.g. to remove a connector on one device from a socket on the other device) that takes a finite amount of time (e.g. somewhere in the range of one tenth of a second to one second) and imminent disconnection may be detected (in block 202) by detecting the start of the sliding motion (or an early part of that motion).

The imminent disconnection may be detected (in block 202) by the processor 114, 116 in the device 104, 102 performing the first part of the method of FIG. 2 or may be detected by a sensor (e.g. a proximity sensor or sensor within a physical connector) or other arrangement in the device 104, 102 which then provides an 'imminent disconnection detected' signal to the processor 114, 116.

In response to detecting imminent disconnection of the peripheral device and the host computing device (in block 202), the device 102, 104 which is implementing the first part of the method of FIG. 2, triggers the transfer of data from the host computing device 102 to the peripheral device 104 (block 204). The data transfer (in block 204) may be a data push (e.g. where the host's processor makes a decision on what data to transfer) or a data pull (e.g. where the peripheral device requests specific data from the host computing device). A push or pull data transfer may be used irrespective of where the detection of imminent disconnection is performed (e.g. detection on the host computing device may trigger a push or a pull and detection on the peripheral device may trigger a push or a pull).

In response to the trigger (from block 204), the host computing device 102 transfers data to the peripheral device 104 (block 208) and the peripheral device 104 stores the data received in memory 112 (block 210). This data transfer (in block 208) may be referred to as a 'final data transfer' as it is the last data transfer prior to the disconnection of the two devices (unless the detection in block 202 is a false positive). Prior to transferring data (in block 208), the host computing device 102 may select the data which is to be included in the output data set and hence select the data to be transferred in the final data transfer based on pre-defined criteria (block 206) and this optional selecting operation is described in more detail below.

The data which is transferred (in block 208) in response to the trigger (in block 204) and stored in memory (in block 210) determines, at least in part, an output data set which is fixed following the disconnection of the host computing device 102 and peripheral device 104. In various examples, the data which is transferred in the final data transfer (in block 208) comprises some or all of the output data set, e.g. the data which is transferred (in block 208) may comprise three data items, A, B and C, and the output data set (which is fixed following the disconnection) may comprise only these data items received in the transfer. In various examples, the data which is transferred defines what parts of the data which is already stored in the memory 112 in the peripheral device 104 forms part of the output data set. For example, the memory 112 may already store data items A, B and C and the data which is transferred in response to the trigger (in block 208) may comprise data items D, E, F and define that the output data set comprises data items D, E, F and additionally pre-stored data item C. In another example, the memory 112 may already store data items A, B and C and the data which is transferred in response to the trigger (in block 208) may define that the output data set comprises pre-stored data item C only and in this example, no further data items are transferred for inclusion in the output data set in response to the trigger.

In a further example, the data which is transferred comprises updates to already stored data, e.g. the memory 112 may already store data items A, B and C and the data which is transferred in response to the trigger (in block 208) may comprise updates to one or more of these stored data items. By only transferring updates, the amount of data that has to be transferred in the final data transfer is reduced (e.g. compared to transferring the entirety of A, B and C).

In various examples, the data which is transferred (in block 208) in response to the trigger (in block 204) and stored in memory (in block 210) may determine an output data set by using a data template (which may be selected from a set of templates stored on the peripheral device). In an example, the data which is transferred (in block 208) may be combined with a template data set to generate the output data set. A data template may, for example, cause the data type to change (e.g. in response to sending a few fields of text, the text fields may be combined into a rendering template so that the resulting output data set is an image for display which contains the field of text rendered in specific fonts at specific locations in the image).

Some of the examples described in the previous paragraph involve some pre-caching of data on the peripheral device 104, e.g. data item C which has already been stored in the memory 112 on the peripheral device 104 is included in the output data set along with the newly received data items D, E and F or data items A, B and C which have already been stored in the memory 112 on the peripheral device 104 form the output data set as a result of information provided in the final data transfer (in block 208). By pre-caching data, the entire output data set does not need to be transferred in the final data transfer (in block 208) which may be useful where the amount of time between detection (in block 202) and actual disconnection is small and/or where the data rate of the connection between the host computing device 102 and the peripheral device 104 is low compared to the amount of data in the output data set (e.g. as a result of a poor connection and/or a large output data set). In some of the examples, the final data transfer does not include any of the actual data items which form the output data set but instead the data transfer defines which proper subset of the pre-cached data is to form the output data set and so this example may provide the smallest (e.g. in terms of amount of data to transfer) and hence quickest final data transfer. This may, for example, be used such that the data transfer defines which elements of pre-cached data are still up-to-date (or otherwise relevant) and are therefore to be included in the output data set.

The detection of imminent disconnection (in block 202) may, in addition to triggering a data transfer (in block 204) also trigger a change in the way in which data is transferred from the host computing device 102 to the peripheral device 104 (in block 208). For example, prior to detection of imminent disconnection, data may be transferred from the host computing device 102 to the peripheral device 104 using a scheme that transfers data quickly but is not very robust (e.g. in response to an interruption in the communication link) and in response to detecting imminent disconnection (in block 202) the host computing device 102 (e.g. the communication interface 110) may switch to a slower but more robust (e.g. more reliable) mechanism.

Following disconnection from the host computing device 102, the peripheral device 104 outputs data from the output data set (which is now fixed) via the output device 106 (block 212). In various examples, there may be no user interaction to select data to be output following disconnection, i.e. all the data in the output data set may be output (in block 212). In an example where the output device 106 is an electronic paper display, the output data set may comprise a single page of content (e.g. an image and/or text) which is then displayed on the display and does not change (e.g. until the display can no longer display any content for any reason). In another example where the output device 106 is an electronic paper display, the output data set may comprise more than one page of content and these may be displayed one after another on the display. In this example, the peripheral device 104 additionally comprises a power source (not shown in FIG. 1) because, as described above, although an electronic paper display can display a fixed image for a long period of time with little/no power consumption, power is required to change the content that is displayed.

In other examples, however, there may be limited user interaction on the peripheral device 104 to enable a user to select data for output from within the fixed output data set. In such examples, the peripheral device 104 may comprise an input device (not shown in FIG. 1) such as a button or sensor (e.g. arranged to sense a user touching, shaking or otherwise moving the peripheral device) and a power source (also not shown in FIG. 1), where the power source may, for example, comprise a power store (e.g. a battery) or a means for generating power locally (e.g. a power harvesting mechanism, where in various examples the power may be harvested from the user's action to provide an input). In response to a signal from the input device, the peripheral device 104 (e.g. the processor 114) may change what data is output from within the fixed output data set. For example, where the output device 106 is an electronic paper display, the output data set may comprise more than one page of content and a user may be able to step through the content pages using the input device (e.g. in response to a signal from the input device, the peripheral device displays the next page of content from the fixed output data set).

As described above, the data communication between the host computing device 102 and peripheral device 104 may use wired or wireless technologies and where wireless technologies are used, these may operate over a short range (e.g. over a few millimeters or centimeters). Three systems 30-32, which are further examples of the system shown in FIG. 1 and described above, are shown in FIG. 3 and described below. It will be appreciated that the host and/or peripheral devices may comprise additional functional elements in addition to those shown in FIG. 3.

Figure 3:
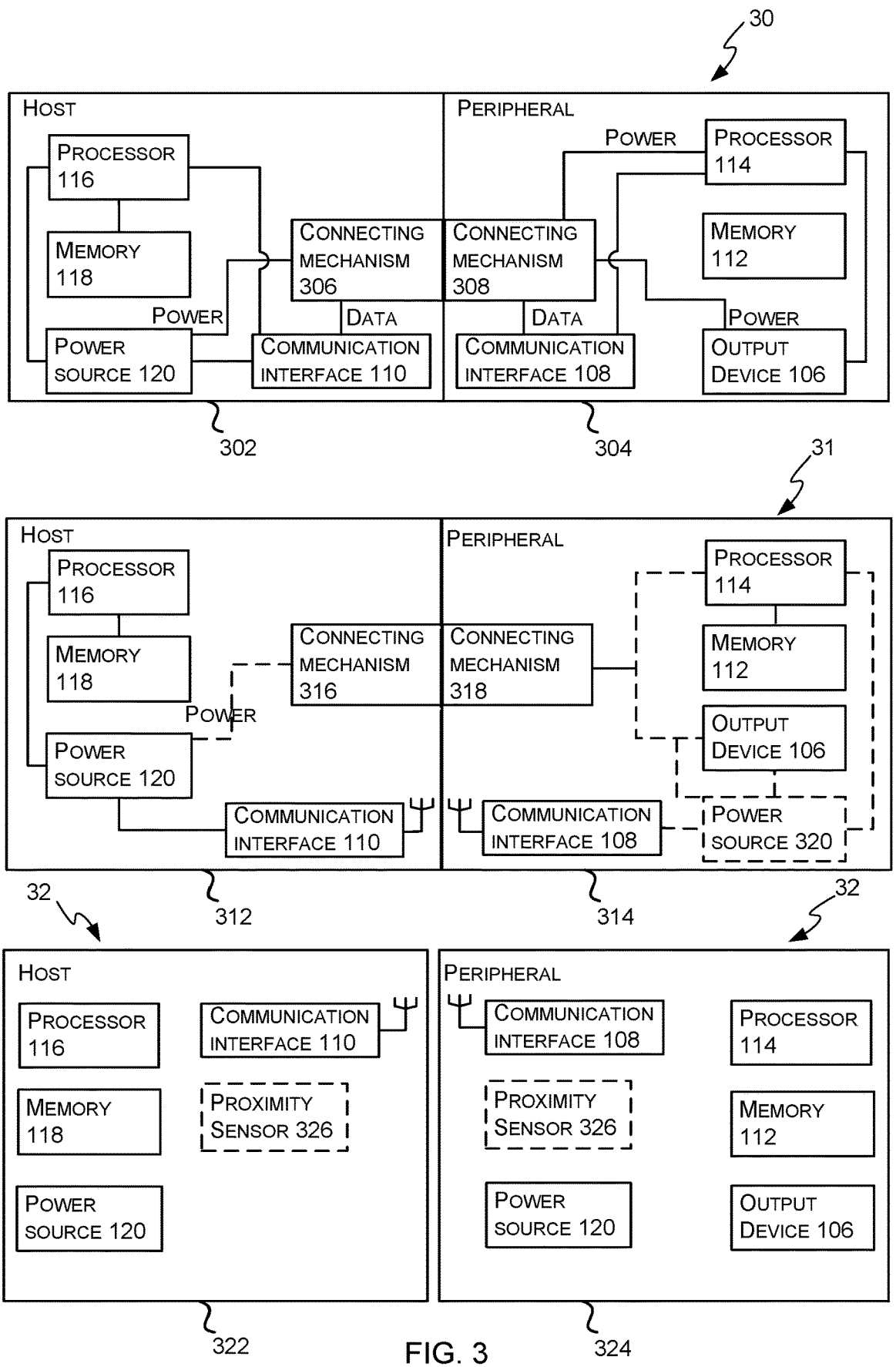
FIG. 3 shows schematic diagrams of further example systems comprising a host computing device and a peripheral device which are variations on the system shown in FIG. 1.

In the first example system 30 shown in FIG. 3, the data communication between the host computing device 302 and peripheral device 304 uses a wired technology and so when the two devices 302, 304 are connected (i.e. such that they can communicate with other) they are also physically connected (as shown in FIG. 3). In the example shown, a connecting mechanism 306, 308 provides both a power connection between the devices 302, 304 and a data connection and may also provide an attachment force that holds the two devices 302, 304 in contact with each other (e.g. the connecting mechanism 306, 308 may comprise a plug and socket arrangement). Alternatively, the force that holds the two devices 302, 304 in contact with each other may be provided by a separate mechanism (e.g. an arrangement of magnets) from the electrical connections between the two devices 302, 304 and in various examples, there may be separate connectors for power and data or power may be provided wirelessly.

In system 30, the peripheral device 304 does not comprise a separate power source and instead power is only provided from the host computing device 302 when they are physically connected together (power is provided via the connecting mechanism 306, 308). In such an example, the output device 106 is a persistent display (e.g. a bistable or multistable display) and the detection of imminent detection is performed sufficiently in advance of actual disconnection that the output data set can be rendered on the persistent display. In a variation on that shown in FIG. 3, however, the peripheral device 304 may additionally comprise a power source (e.g. a rechargeable battery, capacitor or supercapacitor) which may, for example, be charged from the host computing device 302 whilst the two are physically connected together and then used to power the peripheral device 304 when it is physically disconnected from the host computing device 302.

In system 30, the detection of imminent disconnection (in block 202 and by either the host computing device 302 or the peripheral device 304) may be performed based on detecting motion of (or within) the connecting mechanism 306, 308, where, as described above, the motion may be detected directly or a change in position/separation may be detected where this change is a result of motion. In other examples, the detection of imminent disconnection may be based on detection of a user's hand position or grip which indicates that they are about to physically separate the two devices 302, 304.

In the second example system 31 shown in FIG. 3, the data communication between the host computing device 312 and peripheral device 314 uses a wireless technology (e.g. short-range wireless) and so the two devices 312, 314 need not be physically connected to be able to communicate with other. However, the devices 312, 314 include a connecting mechanism 316, 318 which provides an attachment force that holds the two devices 312, 314 in contact with each other (e.g. the connecting mechanism 316, 318 may comprise a plug and socket arrangement or an arrangement of magnets) and may also provide a power connection between the devices 312, 314.

In system 31, the peripheral device 314 may comprise a separate power source 320 (e.g. a rechargeable battery, capacitor or super-capacitor which may be charged from the host computing device 312 via the connecting mechanism 316, 318 whilst the two are physically connected together or via a separate mechanism such as one using wireless charging) or power may only be provided from the host computing device 312 when they are physically connected together (e.g. power is only provided via the connecting mechanism 316, 318).

In system 31, the detection of imminent disconnection (in block 202 by either the host computing device 312 or the peripheral device 314) may be performed based on detecting motion of (or within) the connecting mechanism 316, 318, where, as described above, the motion may be detected directly or a change in position/separation may be detected where this change is a result of motion. Alternatively, since the data communication uses a wireless technology, the detection of imminent disconnection (in block 202) may be performed based on a change (e.g. increase) in separation of the two devices 312, 314 (e.g. using a proximity sensor); based on a change (e.g. drop) in signal strength/quality of the data connection between the host computing device 312 and the peripheral device 314 (or based on a change in another signal parameter); and/or based on whether power is being provided by the host computing device 312 to the peripheral computing device 314 or not, where this may be detected as a change in the power drawn from the host computing device 312 (e.g. the load on the host computing device) as detected by the host computing device 312 or whether power is being received the peripheral device 314, as detected by the peripheral device 314.

In the third example system 32 shown in FIG. 3, the data communication between the host computing device 322 and peripheral device 324 uses a wireless technology (e.g. short-range wireless) and so the two devices 322, 324 need not be physically connected to be able to communicate with other. Unlike devices 312, 314 in system 31, the devices 322, 324 in system 32 do not include a connecting mechanism which physically connects the two devices 322, 324 together. Consequently, the peripheral device 324 comprises a power source 320 which may harvest power from the host computing device 322 (e.g. by harvesting wireless emissions from the host computing device 322) or may provide power in another way (e.g. it may be a battery, capacitor or super-capacitor which is charged from a mains electricity supply).

In system 32, the detection of imminent disconnection (in block 202 by either the host computing device 322 or the peripheral device 324) may be performed based on detecting a change (e.g. increase) in separation of the two devices 322, 324 (e.g. using a proximity sensor 326, 328) or based on a change (e.g. drop) in signal strength/quality of the data connection between the host computing device 322 and the peripheral device 324 (or based on a change in another signal parameter).

In various systems there may be multiple triggers resulting in a repeated transfer of data prior to disconnection (e.g. blocks 202-210 may be repeated before progressing to block 212) with the different iterations using different encoding schemes (e.g. using progressively encoded data, so for example a low resolution version of an image may be initially transferred, followed by the higher resolution differences, such that depending upon the time taken to actually disconnect, a lower or higher resolution version is included in the output data set) and/or using prioritized transfer (e.g. such that data considered most important is transferred in response to a first trigger in a first iteration and in subsequent iterations, data of decreasing importance is transferred). For example, where the detection of imminent disconnection (in block 202) is performed based on detecting a change (e.g. increase) in separation of the two devices (e.g. using a proximity sensor) or based on a change (e.g. drop) in signal strength/quality of the data connection between the host computing device and the peripheral device (or based on a change in another signal parameter), there may be multiple thresholds (e.g. defined in terms of a separation of the devices or change in the monitored signal parameter, which may be strength/quality) and each threshold (as detected in block 202) may trigger the transfer of data (in block 204). Only upon actual disconnection is the output data set fixed.

In examples where wired technology or short-range wireless technology is used for the data connection between the host computing device and the peripheral device and where there is a connecting mechanism in the two devices which provides an attachment force that holds the two devices in contact with each other, a locking mechanism may also be provided (e.g. as part of the connecting mechanism) which prevents the actual physical separation of the two devices until the data transfer (in block 208) is complete. Such a locking mechanism may comprise a mechanical actuator (e.g. a small linear actuator), one or more electromagnets, electric muscle fibers or a shape-memory alloy which is controlled by the communication interface 108, 110 in either the peripheral device or the host computing device or by the processor 114, 116 in either the peripheral device or the host computing device.

Use of a locking mechanism ensures that the data transfer can always be completed. Consequently, a user may start to separate the two devices, e.g. by starting to slide the peripheral device connector out of a socket on the host computing device, and this is detected (in block 202) and triggers the transfer of data (in block 204); however, the user is prevented from completing the physical separation (i.e. prevented from actually pulling the devices apart) until the transfer (in block 208) has completed.

As shown in FIG. 2, the host computing device 102 may make a selection (in block 206) which identifies the data in the output data set and as a result of this selection, the host computing device 102 determines what data to transfer to the peripheral device 104. As described above, the data which is transferred (in block 208) may be the entire output data set, a part of the output data set and/or data defining the contents of the output data set which is fixed following disconnection of the host computing device 102 and the peripheral device 104. The selection (in block 206) may automatically determine data for inclusion in the output data set (e.g. the next C calendar appointments or the N most recently taken photographs may be automatically identified and included in the output data set, where N and C are integers) and/or identify manually specified data for inclusion in the output data set (e.g. a user may flag an email as important and hence this may be included in the output data set). The system may provide an API (application programming interface) to specify the information for various applications running on the host computing device 102 and the information transferred may be defined by an operating system running on the host computing device 102 or by one or more applications running within the operating system.

In examples where auto-detection of information is used (in block 206), the auto-detection may be based on a user's history of browsed information pieces such as one or more of:

Recently browsed documents, to-do lists and messages (e.g. such that the contents of recently read emails, text messages and any attachments are included in the output data set);

Recent appointments (e.g. such that an overview of upcoming appointments can be included in the output data set);

Travel information (e.g. when the user is travelling, maps or other useful information such as connections for public or private transport may be included in the output data set); and Weather, news and e-books (e.g. recent news items may be included in the output data set).

As noted above, the final data transfer (in block 208) may include the entire output data set or data items may be pre-cached on the peripheral device (i.e. transferred to the peripheral device before imminent disconnection is detected). In various examples, automatic information transfers (i.e. automatic pre-caching) may be triggered by particular events, such as when a user's calendar is updated or new e-tickets are received.

The inclusion of manually specified data items in the output data set adds personal preferences to the user experience. A user may be able to manually specify which auto-detected information is included in the output data set and/or the user may be able to specify that information such as captures of screen shots, particular documents, and/or their last viewed screen are included in the output data set.

As described above, the host computing device 102 may, for example, be a portable or handheld computing device (e.g. a smart phone, laptop computer, tablet computer, handheld games console, etc.) or a non-portable computing device such as a desktop computer or games console. The peripheral device 104 may, for example, be a wearable device or other portable device (e.g. a small display device which may be placed in a user's pocket or wallet or a larger display device that operates as an electronic photograph frame) or a larger, non-portable device, for example, a computer monitor (or display), a larger electronic photo-frame (e.g. which may be permanently installed), a situated display, a display integrated into a larger appliance (e.g. integrated into the front panel of a home appliance such as a refrigerator) etc. In any system, however, at least one of the host computing device 102 and the peripheral device 104 is a portable device. Various example systems are described in more detail below.

In an example, the host computing device 102 is a laptop or tablet computer and the peripheral device 104 is a separate computer display which may, for example, be installed on a user's desk or workspace. In this example, the display has a separate power source (e.g. it is connected to a mains electricity supply) and may have a wired or wireless data connection to the laptop or tablet computer. The output device 106 is the LCD, electronic paper, or other type of display provided in the computer display. In response to either the display or the computer detecting imminent disconnection (in block 202), the computer defines the output data set to be details of the user's upcoming appointments (e.g. their calendar for that day and/or that week) and performs the final data transfer (in block 208). Subsequently, upon disconnection of the display and the computer, the display displays the user's calendar information (in block 212). In this way, when the user approaches their monitor, they can easily see their schedule even before they have reconnected the display to the computer (which may require putting the computer onto a docking station and powering up the computer and so take several minutes).

In another example, the host computing device 102 is a smart phone, digital camera, laptop or tablet computer and the peripheral device 104 is a display device which operates as an electronic photograph frame and may be free-standing (and in various examples, portable) or fixed in position (e.g. mounted on a wall). The output device 106 is an LCD, electronic paper, or other type of display provided in the electronic photograph frame. In response to either the host computing device or the electronic photograph frame detecting imminent disconnection (in block 202), the host computing device defines the output data set to be the N most recently taken photographs (which may have been taken on the host computing device or otherwise stored on the host computing device) and performs the final data transfer (in block 208). As noted above, the final data transfer (in block 208) may include one or more of these N photographs and/or one or more of the N photographs may already have been transferred to the electronic photograph frame. Subsequently, upon disconnection of the electronic photograph frame and the host computing device, the electronic photograph frame displays the N photographs (in block 212). As described above, the electronic photograph frame may include a user input device (e.g. a button or sensor) to enable the user to step through the N photographs and/or select a particular one of the N photographs to be displayed.

In a further example, the host computing device 102 is a smart phone, laptop or tablet computer and the peripheral device 104 is a small electronic paper display device which may, for example, be a standalone device or may be affixed to the back of a user's ID badge or wallet or may be integrated within a wearable device or home appliance. In this example, the display device does not have a separate power source and so can only display a single image (which may include text) and the display device may have a wired or wireless data connection to the host computing device. The output device 106 is the electronic paper display in the display device. In response to either the display device or the host computing device detecting imminent disconnection (in block 202), the host computing device defines the output data set to be details of the user's upcoming appointments (e.g. their calendar for that day or their next N appointments) and performs the final data transfer (in block 208). Subsequently, upon disconnection of the display device and the host computing device, the display device displays a fixed image comprising the appointment information (in block 212). In this way, a user has access to their schedule when they are away from their host computing device or when that device is otherwise disconnected from the display device (e.g. the host computing device may be in the user's pocket or bag).

In another example, the host computing device 102 is a smart phone or tablet computing device and the peripheral device 104 is a game controller which may, for example, be clipped onto (or otherwise attached to) the host computing device 102. In response to either the host computing device or the game controller detecting imminent disconnection (in block 202), the host computer transfers current gaming data (e.g. scores, settings, etc.) in the final data transfer (in block 208). Subsequently, upon disconnection of the host computing device and the computer, the game controller may display the user's game statistics (e.g. their highest or most recent score). This also means that if the user subsequently attaches the game controller to a different host computing device 102, any settings which were stored onto the controller in the final data transfer (in block 208) may be transferred to the different host computing device.

In another example, the host computing device 102 is a smart phone or tablet computing device and the peripheral device 104 is a television or other display device (e.g. a computer monitor). In response to either the host computing device or the game controller detecting imminent disconnection (in block 202), the host computer transfers a set of images (e.g. a set of recently captured images, such as the last 20 images captured on the host computing device 102)

in the final data transfer (in block 208). Subsequently, upon disconnection of the host computing device and the display device, the display device may display the images (e.g. in the form of a slide show).

Figure 4:
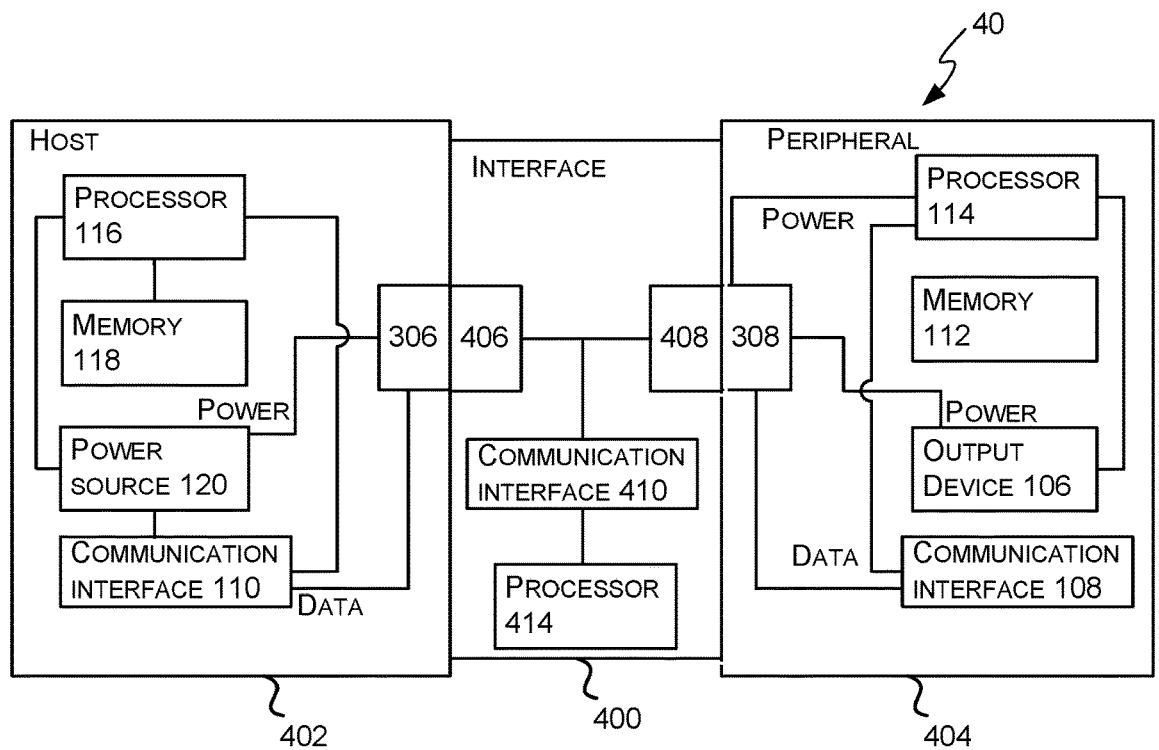
FIG. 4 shows schematic diagrams of further example systems comprising a host computing device and a peripheral device which are variations on the systems shown in FIGS. 1 and 3.
Figure 4:
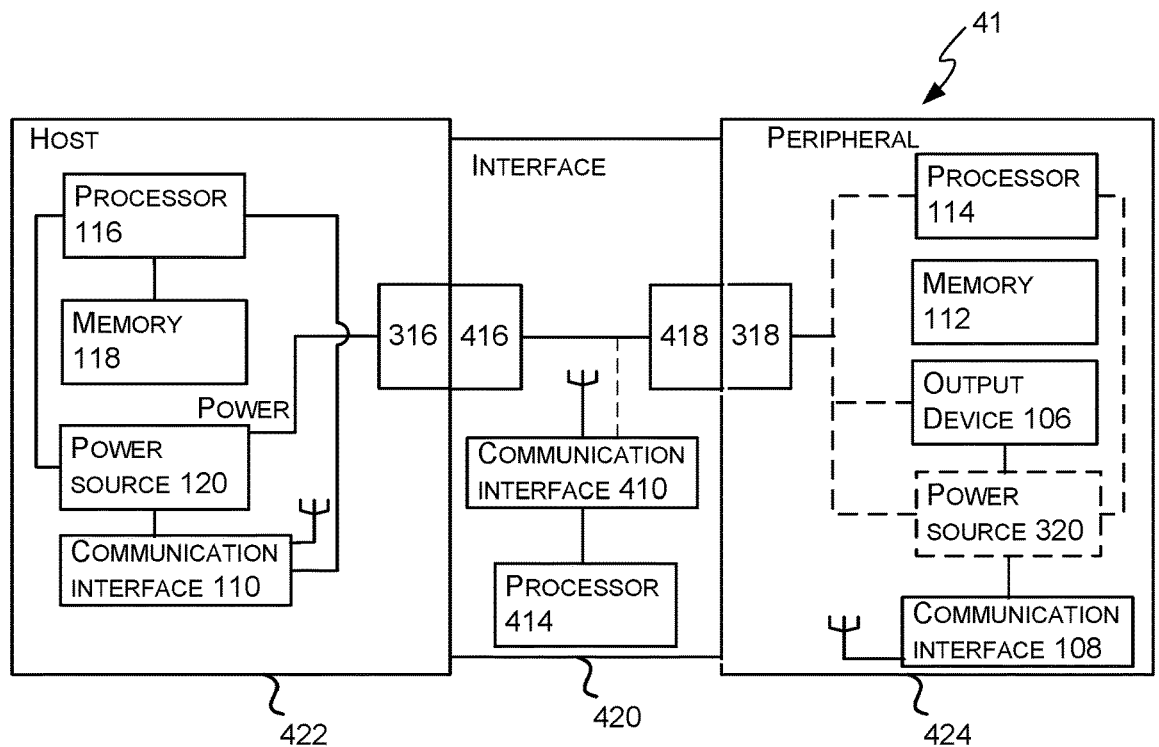

In the examples described above, the detection of imminent detection (in block 202) and the triggering of the transfer of data (in block 204) is performed by either the host computing device or the peripheral computing device. In other examples, however, the detection and triggering (in blocks 202 and 204) may instead be performed by an interface device which physically connects the host and peripheral devices together and two examples are shown in FIG. 4. In the first example 40, the host computing device 402 and the peripheral device 404 communicate via a wired link (via the interface device 400, such that the interface 400 provides a physical, power and data connection between the host and the peripheral) and in the second example 41, the host computing device 422 and the peripheral device 424 communicate wirelessly (and the interface device 420 provides a physical connection and optionally a power connection between the host and the peripheral). In these examples, the processor 414 in the interface device 400, 420 detects imminent disconnection (e.g. using any of the methods and apparatus described above) and triggers the data transfer (in block 204) via the communication interface 410 in the interface device 400, 420. The communication interface 410 may communicate over a wired or wireless link to the host device (where a data push is used) or the peripheral device (where a data pull is used) to trigger the data transfer.

The host computing device 102 and/or peripheral device 104 described above may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The examples described above and shown in FIGS. 1 and 3 are provided as examples and not as limitations. As those skilled in the art will appreciate, the present examples are suitable for application in a variety of different types of systems comprising a host computing device and a peripheral device that communicates with the host computing device and although not shown in the examples described above, a peripheral device may communicate with more than one host computing device and a host computing device may communicate with more than one peripheral device.

Alternatively or in addition to the other examples described herein, examples include any combination of the following further examples.

A first further example provides a peripheral device comprising: a communication interface arranged to communicate with a host computing device; an output device; a memory arranged to store an output data set for output via the output device; and a processor arranged to detect imminent disconnection of a communication link between the peripheral device and the host computing device and in response, to trigger a data transfer from the host computing device to the peripheral device via the communication interface, and wherein following disconnection of the communication link the output data set is fixed.

The data transfer from the host computing device to the peripheral device via the communication interface may be over a physical communication link or a short-range wireless link.

The output data set may be defined based, at least in part, on the triggered data transfer. The triggered data transfer may include the output data set.

The processor may be arranged to detect imminent disconnection of a communication link between the peripheral device and the host computing device based on a physical separation of the peripheral device and the host computing device.

The peripheral device may further comprise at least one of: a proximity sensor arranged to detect a physical separation of the peripheral device and the host computing device; and a connecting mechanism comprising a sensor arranged to detect motion of the peripheral device relative to the host computing device, and wherein the processor may be arranged to detect imminent disconnection of the communication link between the peripheral device and the host computing device based on sensor data.

The peripheral device may further comprise a connecting mechanism arranged to receive power from the host computing device and wherein the processor may be arranged to detect imminent disconnection of the communication link between the peripheral device and the host computing device in response to receiving no power via the connecting mechanism.

The peripheral device may further comprise a connecting mechanism arranged to physically connect the peripheral device to the host computing device and wherein the connecting mechanism includes a locking mechanism controlled by the processor and wherein the processor may be further arranged to use the locking mechanism to prevent physical separation of the host computing device and the peripheral device until the data transfer is complete.

The communication interface may be arranged to communicate with the host computing device using wireless signals and wherein the processor may be arranged to detect imminent disconnection of a communication link between the peripheral device and the host computing device based on change in a parameter of the wireless signals.

The output device may be an electronic paper display.

The peripheral device may further comprise an input device and wherein the output data set comprises a plurality of data items and the processor may be arranged to output a different one of the plurality of data items via the output device in response to a user input via the input device.

A second further example provides a host computing device comprising: a communication interface arranged to communicate with a peripheral device comprising an output device; and a processor arranged to detect imminent disconnection of a communication link between the peripheral device and the host computing device and in response, to trigger a data transfer from the host computing device to the peripheral device via the communication interface, and wherein a fixed output data set output by the output device following disconnection of the communication link is defined based, at least in part, on the triggered data transfer.

The triggered data transfer may include the output data set.

The processor may be arranged to detect imminent disconnection of a communication link between the peripheral device and the host computing device based on a physical separation of the peripheral device and the host computing device.

The host computing device may further comprise at least one of: a proximity sensor arranged to detect a physical separation of the peripheral device and the host computing device; and a connecting mechanism comprising a sensor arranged to detect motion of the peripheral device relative to the host computing device, and wherein the processor is arranged to detect imminent disconnection of the communication link between the peripheral device and the host computing device based on sensor data.

The host computing device may further comprise a power source and a connecting mechanism arranged to provide power and optionally data to the peripheral device and wherein the processor may be arranged to detect imminent disconnection of the communication link between the peripheral device and the host computing device based on reduction in load on the power source.

The host computing device may further comprise a connecting mechanism arranged to physically connect the peripheral device to the host computing device and wherein the connecting mechanism includes a locking mechanism controlled by the processor and wherein the processor may be further arranged to use the locking mechanism to prevent physical separation of the host computing device and the peripheral device until the data transfer is complete.

The communication interface may be arranged to communicate with the peripheral device using wireless signals and wherein the processor may be arranged to detect imminent disconnection of a communication link between the peripheral device and the host computing device based on change in a parameter of the wireless signals.

The processor may be further arranged, in response to the trigger, to select data for transfer to the peripheral device based on at least one of: auto-detection of information based on a user's history of browsed information; and user specified data items.

A third further example provides an interface device arranged to physically connect a host computing device and a peripheral device, the interface device comprising: a communication interface arranged to communicate with the host computing device and/or the peripheral device; and a processor arranged to detect imminent disconnection of a communication link between the peripheral device and the host computing device and in response, to trigger a data transfer from the host computing device to the peripheral device via the communication interface.

A fourth further example provides a computer implemented method comprising: detecting, by a processor in a device, imminent disconnection of a communication link between a peripheral device and a host computing device; and in response to detecting imminent disconnection of the communication link between the peripheral device and the host computing device, triggering a data transfer from the host computing device to the peripheral device via a communication interface in the device. The device may be the peripheral device or the host computing device.

A fifth further example provides a device comprising: a communication interface arranged to communicate with a host computing device and/or a peripheral device comprising an output device; and a processor arranged to detect imminent disconnection of a communication link between the peripheral device and the host computing device and in response, to trigger a data transfer from the host computing device to the peripheral device via the communication interface, and wherein a fixed output data set output by the output device in the peripheral device following disconnection of the communication link is defined based, at least in part, on the triggered data transfer.

The device may be the peripheral device and may further comprise: the output device; and a memory arranged to store the output data set. The device may further comprising a connecting mechanism arranged to receive power from the host computing device and wherein the processor may be arranged to detect imminent disconnection of the communication link between the peripheral device and the host computing device in response to receiving no power via the connecting mechanism. The device may further comprise an input device and wherein the output data set comprises a plurality of data items and the processor may be arranged to output a different one of the plurality of data items via the output device in response to a user input via the input device.

The device may be the host computing device. The device may further comprise a power source and a connecting mechanism arranged to provide power and optionally data to the peripheral device and wherein the processor may be arranged to detect imminent disconnection of the communication link between the peripheral device and the host computing device based on reduction in load on the power source. The processor may be further arranged, in response to the trigger, to select data for transfer to the peripheral device based on at least one of: auto-detection of information based on a user's history of browsed information; and user specified data items.

In the fifth further example, the output device may be an electronic paper display.

In the fifth further example, the data transfer from the host computing device to the peripheral device via the communication interface may be over a physical communication link or a short-range wireless link.

In the fifth further example, the triggered data transfer may include the output data set.

In the fifth further example, the processor may be arranged to detect imminent disconnection of a communication link between the peripheral device and the host computing device based on a physical separation of the peripheral device and the host computing device.

In the fifth further example, the device may further comprise at least one of: a proximity sensor arranged to detect a physical separation of the peripheral device and the host computing device; and a connecting mechanism comprising a sensor arranged to detect motion of the peripheral device relative to the host computing device, and wherein the processor may be arranged to detect imminent disconnection of the communication link between the peripheral device and the host computing device based on sensor data.

In the fifth further example, the device may further comprise a connecting mechanism arranged to physically connect the peripheral device to the host computing device and wherein the connecting mechanism includes a locking mechanism controlled by the processor and wherein the processor may be further arranged to use the locking mechanism to prevent physical separation of the host computing device and the peripheral device until the data transfer is complete.

In the fifth further example, the communication interface may be arranged to communicate using wireless signals and wherein the processor may be arranged to detect imminent disconnection of a communication link between the peripheral device and the host computing device based on change in a parameter of the wireless signals.

In the fifth further example, the device may be an interface device arranged to physically connect the host computing device and the peripheral device.

A sixth further example provides a device comprising: a means for communicating with a host computing device and/or a peripheral device comprising an output device; and means for detecting imminent disconnection of a communication link between the peripheral device and the host computing device and in response, to trigger a data transfer from the host computing device to the peripheral device via the communication interface, and wherein a fixed output data set output by the output device in the peripheral device following disconnection of the communicating means is defined based, at least in part, on the triggered data transfer.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A peripheral device comprising:
    a communication interface configured to communicate with a host computing device;
    an output device;
    a memory configured to store an output data set for output via the output device; and
    a processor configured to:
        monitor a communication link between the host computing device and the peripheral device via the communication interface;
        detect imminent disconnection of the communication link based on an identification of a change in operation of the peripheral device that precedes the disconnection of the communication link, wherein the change in the operation of the peripheral device is identified from at least one of the following:
        change in signal strength of a data connection,
        change in signal strength of the communication link,
        change in electrical power supply to the peripheral device, detection of user touch to the peripheral device, or change of position for the peripheral device, wherein the change of position is determined by comparing sensor data from a sensor of the peripheral device and a sensor of the host computing device;

trigger, in response to detection of the imminent disconnection, a data transfer from the host computing device to the peripheral device via the communication interface;

receive, in response to the trigger, the output data set; and display the output data set via the output device, before the disconnection of the communication of the communication link, wherein following the disconnection of the communication link the output data set is fixed in a persistent display state such that the display of the output data set does not change.

2. The peripheral device according to claim 1, wherein the output data set is defined based, at least in part, on the triggered data transfer.

3. The peripheral device according to claim 1, wherein the imminent disconnection of the communication link is based on the change in signal strength of the data connection and the change in signal strength results in a loss of signal.

4. The peripheral device according to claim 1, further comprising a connecting mechanism configured to wirelessly receive power from the host computing device and wherein the imminent disconnection of the communication link is based on the change in electrical power supply to the peripheral device, and wherein the change in electrical power is a loss of received power via the connecting mechanism.

5. The peripheral device according to claim 1, further comprising a wired connecting mechanism configured to receive power from the host computing device and wherein the imminent disconnection of the communication link is based on the change in electrical power supply to the peripheral device, and wherein the change in electrical power is a loss of received power via the wired connecting mechanism.

6. The peripheral device according to claim 1, wherein the imminent disconnection of the communication link is based on the change in signal strength of the communication link and the change in signal strength is a signal strength reduction of 10%.

7. The peripheral device according to claim 1, wherein the imminent disconnection of the communication link is based on the detection of user touch to the peripheral device and the detection of user touch to the peripheral device is a gripping of the peripheral device.

8. The peripheral device according to claim 1, wherein the imminent disconnection of the communication link is based on detection of motion for the peripheral device and the detection of motion for the peripheral device is motion of the peripheral device relative to the host computing device.

9. The peripheral device according to claim 1, wherein the imminent disconnection of the communication link is based on the change of position for the peripheral device and the change of position for the peripheral device is a separation of the peripheral device relative to the host computing device.

10. A host computing device comprising:
a communication interface configured to communicate with a peripheral device comprising an output device; and a processor configured to:
monitor a communication link between the host computing device and the peripheral device via the communication interface;

detect imminent disconnection of communication link based on an identification of a change in operation of the host computing device that precedes the disconnection of the communication link, wherein the change in the operation of the host computing device is identified from at least one of the following:
change in signal strength of a data connection,
change in signal strength of the communication link,
change in electrical power supply to the peripheral device,
detection of user touch to the peripheral device, or
change of position for the peripheral device, wherein the change of position is determined by comparing sensor data from a sensor of the peripheral device and a sensor of the host computing device; and trigger, in response to detection of the imminent disconnection, a data transfer of output data between the host computing device and the peripheral device via the communication interface, to enable the output data to be received and output at the peripheral device before the disconnection of the communication link, and wherein following the disconnection of the communication link, the output data is fixed in a persistent display state such that the output of the output data at the peripheral device does not change.

11. The host computing device according to claim 10, wherein detection of the imminent disconnection is based on the change in signal strength of the communication link and the change in signal strength is a strength reduction of 10%.

12. The host computing device according to claim 10, wherein detection of the imminent disconnection is based on detection of user touch to the peripheral device and the detection of user touch to the peripheral device is a gripping of the peripheral device.

13. The host computing device according to claim 10, further comprising a wired connecting mechanism configured provide power to the peripheral device and wherein detection of the imminent disconnection is based on the change in electrical power supply to the peripheral device, and wherein the change in electrical power supply is a termination of power to the peripheral device via the wired connecting mechanism.

14. The host computing device according to claim 10, wherein the indicator detection of imminent disconnection is based on detection of motion for the peripheral device and the detection of motion for the peripheral device is motion of the peripheral device relative to the host computing device.

15. A method comprising:
monitoring a communication link between a first device and a second device;

detecting imminent disconnection of the communication link based on an identification of a change in operation of either the first device or the second device that precedes the disconnection of the communication link, wherein the change in the operation of either device is identified from at least one of the following:
change in signal strength of a data connection,
change in signal strength of the communication link,
change in electrical power supply to the second device,
detection of user touch to the second device, or
change of position for the second device, wherein the change of position is determined by comparing sensor data from a sensor of the second device and a sensor of the first device; and triggering, in response to detection of the imminent disconnection, a data transfer of output data between a source and destination of the first device and the second device, before the disconnection of the communication of the communication link, and wherein following the disconnection of the communication link, the output data is fixed in a persistent display state at the destination such that the output of the output data at the destination does not change.

16. The method of claim 15, wherein the first device is a host computing device and the second device is a peripheral device.

17. The method of claim 15, wherein the first device is a peripheral device and the second device is a host computing device.

18. The method of claim 15, wherein the detecting of the imminent disconnection is based on detection of motion for the first device and the detection of motion for the first device is motion of the first device relative to the second device.

19. The method of claim 15, wherein the detecting of the imminent disconnection is based on the change in signal strength of the communication link and the change in signal strength is a strength reduction of 10%.

20. The method of claim 15, wherein the detecting of the imminent disconnection is based on a change of position for the first device and the change of position for the first device is a separation of the first device relative to the second device.

\* \* \* \* \*